United States Patent [19]
VanNatta et al.

[11] Patent Number: 5,687,756
[45] Date of Patent: Nov. 18, 1997

[54] VEHICLE REFUELING VALVE

[75] Inventors: Larry VanNatta, Mt. Morris; Manuel D. Rosas, Coleta; Terry L. Miller, Sterling, all of Ill.

[73] Assignee: Borg-Warner Automotive, Inc., Sterling Heights, Mich.

[21] Appl. No.: 555,129

[22] Filed: Nov. 8, 1995

[51] Int. Cl.$^6$ .................................................. F16K 24/04
[52] U.S. Cl. ........................ 137/202; 137/43; 251/86
[58] Field of Search ...................... 137/43, 202; 251/86

[56] References Cited

U.S. PATENT DOCUMENTS

| | | | |
|---|---|---|---|
| 2,909,186 | 10/1959 | Larson | 137/202 |
| 3,530,882 | 9/1970 | Case et al. | 137/202 X |
| 5,044,389 | 9/1991 | Gimby | 137/43 X |
| 5,392,804 | 2/1995 | Kondo et al. | 137/202 |
| 5,413,137 | 5/1995 | Gimby | 137/43 X |
| 5,443,561 | 8/1995 | Sakata et al. | 137/202 |

*Primary Examiner*—Gerald A. Michalsky
*Attorney, Agent, or Firm*—Reising, Ethington et al.; Greg Dziegielewski

[57] ABSTRACT

A refueling valve for a motor vehicle includes a body connected to the upper wall of a fuel tank in vertical depending relationship thereon and the body has a body top or cover with a vapor exit passage adapted to be connected to a fuel vapor storage canister, the body includes a portion depending from the cover that has a vapor exit port formed therein communicating with the fuel tank interior adjacent the upper wall of the fuel tank and a vent tube has one end connected to the vapor exit passage and an opposite end communicating with the vent exit port and defining a valve seat closed by a float valve during vehicle fill and wherein the vapor exit port remains open until the float valve is completely closed and wherein the vapor exit port is spaced higher than the valve seat to separate liquid fuel particles from vapor flow. In one embodiment a baffle is located on the body between the valve seat and the vapor exit port to form a liquid trap. In another embodiment a secondary vent valve on the cover is connected to the vapor exit passage. In still another embodiment a pressure transducer port is formed in the cover.

10 Claims, 5 Drawing Sheets

VEHICLE REFUELING VALVE

TECHNICAL FIELD

This invention relates to refueling valves and more particularly to refueling valves with fuel vapor vents and liquid traps for use with a motor vehicle fuel tank.

BACKGROUND OF THE INVENTION

In the typical fuel vapor vent valve for a motor vehicle fuel tank wherein the valve is adapted to prevent spillage in case of shaking, tilting or rollover of the vehicle, the valve normally opens the fuel tank to an orifice that is connected by a vapor exit passage in the valve body to a vapor hose leading to a fuel vapor storage device. The valve body is commonly made as a one-piece plastic injected molded part that for simplicity of design has a simple direct connection between the orifice and the vapor exit passage. However, this connection has a tendency to collect and pass any liquid fuel issuing from the orifice under pressure from the tank on to the vapor storage canister. The latter contains a fuel vapor absorber such as carbon and any liquid fuel delivered thereto will quickly reduce its vapor adsorbing ability. It is difficult to configure the top of the molded body with a vapor exit passage connection that would somehow trap this liquid after it passes through the orifice and then drain the trapped liquid back to the tank. This is also the case where the valve is omitted and only venting is provided through an orifice in a vent body that mounts on the fuel tank.

As to any such possible fuel drainage back to the tank in the case of a vent assembly having a valve that is adapted to block the orifice on overfill, vehicle shaking, tilting and/or vehicle rollover, there is also the consideration of adversely affecting the operation of the valve as it is required to provide for normal venting operation in an upright position but close under these various circumstances to block exit of fuel from the tank. Any such drainage path for liquid fuel trapped downstream of the orifice can not provide a possible path for fuel vapor to vent around the valve in the normal upright attitude of the tank or allow liquid fuel to escape from the tank when tipped or inverted. An example of such systems is set-forth in U.S. Pat. No. 5,044,389, assigned to the assignee of the present invention.

One solution to such problems is set-forth in U.S. Pat. No. 5,413,137, also assigned to the assignee of the present invention. The fuel vapor vent assembly set-forth in the '137 patent embodies a fuel impervious insert that is adapted to be mounted in such a vent or vent valve body and defines both a vertically oriented vent orifice and a liquid basin extending about the exit of this orifice. A simple cavity formed in the interior of the top of the plastic body co-operates with the basin in the insert to define an expansive chamber elevated above the orifice and this chamber communicates the orifice with a horizontal vapor exit passage in the plastic body adapted to be connected to a vapor storage device. The expansive chamber forms an elevated liquid trap at the exit of the orifice that traps liquid from the venting fuel vapor while permitting venting to continue therethrough and then drains the trapped liquid in the basin back into the tank through the orifice in the insert when the pressure in the fuel tank is relieved. The liquid trapping chamber has a ceiling directly opposite the orifice dead ending the vapor stream issuing therefrom and the vapor exit passage is connected to the expansive chamber at a point above the basin. These features combine to aid in separating any liquid fuel out from the vapor and down into the basin and prevent it from passing on to the vapor exit passage and thence to the vapor storage canister.

While suitable for their intended purpose, the fuel vapor vent assemblies set-forth in the aforesaid prior art patents do not include provision for venting vapor from the tank as the float is closing at the same rate at which the fuel tank is being filled nor do they provide a predetermined vapor dome space within said tank to accommodate vapor pressure increases when the refueling valve is closed. Further, the unitary body arrangement is configured to locate the valve seat close to the tank top and vent openings are located at the base of the unitary body such that they will be immersed in fuel when the tank level reaches the float so that venting will be restricted as the float moves between its normally open position and its normally closed position.

It is therefore an object of the present invention to provide a fuel vapor vent device that will vent vapor during fuel fill at the same rate as the rate of fuel flow into the tank while preventing liquid fuel flow to a fuel vapor storage canister.

A further object is to provide such a device that includes a vapor exit port providing vapor venting as a rollover float component moves toward closure as fuel flows through a filler neck of a fuel tank.

Another object is to provide a fuel vapor vent device for a motor vehicle fuel tank having a vapor exit passage with a flow area large enough to vent vapors at the same rate as the fuel tank is being filled so as to prevent pressure build up in the fuel tank during fuel fill.

Another object is to provide such an arrangement wherein the body of the fuel vapor vent device includes vapor exit ports within the tank that remain open as the fuel tank is filled and wherein the exit ports are large enough to vent vapors at the same rate at which the fuel tank is being filled and wherein the vapor exit ports are provided in the body at a point high enough above the valve seat of a roll over valve to prevent liquid fuel carry over to a fuel vapor storage canister.

Yet another object is to provide a fuel vapor vent device that includes a vent tube defining a valve seat and a direct connection to a vapor exit passage in the top of the cover that is connected to a tube for connecting the fuel vapor vent device to the inlet of a charcoal canister wherein the area of the vent tube and the area of the vapor exit passage are substantially equal.

Still another object is to provide a fuel vapor vent device as set-forth in the preceding objects including a refueling valve having a body with a vapor exit passage and a liquid inlet passage and the body being connected to the top of a fuel tank in depending relationship therewith; the valve including a float and a valving element carried by the float and tiltable with respect to the float for compensating for tilt and further characterized by the body further including a vapor exit port adjacent the top and also including a vent tube with a valve seat located below the vapor exit port for preventing liquid fuel particles from entering the vapor exit passage.

Yet another object is to provide a fuel vapor vent device as set-forth in the preceding object wherein the refueling valve includes a vent tube formed as a first tubular member having a length more than one half of that of said body for locating said valve seat at a distance from the upper wall of the fuel tank that will provide for a predetermined vapor dome space within said tank to accommodate vapor pressure increases when the refueling valve is closed.

Still another object of the invention is to provide a fuel vapor vent device with a body having a vapor exit passage and a vapor exit port spaced laterally of said vapor exit passage; a liquid inlet located below both the vapor exit passage and the vapor exit port; a first tubular member supported within said body having one end sealingly connected to the vapor exit passage and having an opposite end defining a valve seat closable by the valving element and located below the vapor exit port for separating liquid fuel particles prior to entering said vapor exit passage and a baffle ring connected to the body below said vapor exit port and spaced from said first tubular member for trapping liquid fuel particles at said vapor exit port for return to the fuel tank through the vapor exit port so as to prevent passage thereof through the first tubular member and out said vapor exit passage.

Still another object of the present invention is to provide the refueling valve of the preceding object further characterized by said baffle ring having an annular base connected to said first tubular member and including an upstanding flange with an I.D. greater than the O.D. of said first tubular member for defining an annular vapor flow path therebetween and said flange further including an O.D. less than the I.D. of said body for defining an annular pocket for trapping fluid; said vapor exit port being formed as a plurality of circumferentially spaced openings in the body member; each of said openings having a lower edge portion located at or below said pocket for draining liquid fuel particles collected therein.

Still another object is to provide a fuel vapor vent device including a refueling valve having a body with a vapor exit passage and a liquid inlet passage and the body being connected to the top of a fuel tank in depending relationship therewith; said valve including a float and a valving element carried by the float and tiltable with respect to the float for compensating for tilt and wherein said body further includes a vapor exit port located above said liquid inlet; a first tubular member supported within said body having one end sealingly connected to the vapor exit passage and having an opposite end defining a valve seat closable by the valving element and located below said vapor exit port for separating liquid fuel particles prior to entering said vapor exit passage and further characterized by a cover member connected to the upper wall of the fuel tank outboard thereof; the cover member forming the vapor exit passage and the body including a valve housing located inboard of said fuel tank and said vapor exit ports being formed in said valve housing adjacent the upper wall of the fuel tank.

Yet another object of the present invention is to provide the refueling valve of in the preceding object further characterized by a baffle ring connected to said body below said vapor exit ports and spaced from said first tubular member for trapping liquid fuel particles at said vapor inlet passage for return to the fuel tank through the vapor inlet passage so as to prevent passage thereof through the first tubular member and out said vapor exit passage.

Another object of the present invention is to provide the refueling valve of the preceding object further characterized by said baffle ring having a base sealingly connected to said first tubular member and including an upstanding flange with an I.D. greater than the O.D. of said first tubular member for defining an annular vapor flow path therebetween and said flange further including an O.D. less than the I.D. of said body for defining an annular pocket for trapping fluid; said vapor inlet passage being formed by a plurality of circumferentially spaced openings in said first tubular member; each of said openings having a lower wall portion located at or below said pocket for draining liquid fuel particles collected therein.

Yet another object of the present invention is to provide a fuel vapor vent device of the preceding objects further including a second tubular member having a height less than that of said first tubular member and located laterally thereof and including a vent therein in communication with said vapor outlet passage and a float valve within said second first tubular member for closing said vent in response to tilt to prevent escape of liquid fuel from the fuel tank through said vent.

Yet another object of the present invention is to provide a fuel vapor vent device of the preceding objects further characterized by said valving element having an annular skirt and a ball joint socket thereon located concentrically of said annular skirt; said float having a ball on one end thereof connected to the ball joint socket for providing freedom of movement between the float and the valving element for adjusting the position of said valving element with respect to said annular valve seat to compensate for tilt.

Another object of the present invention is to provide a fuel vapor vent device of the preceding objects wherein the refueling valve is further characterized by said float comprising a hollow cylindrical member with a closed end and an open end and a weighted closure disc on said open end for sealing the float; said weighted closure disc having a weight selected with respect to the displacement of said hollow cylindrical member for aligning said float vertically within said body for reducing friction between the hollow cylindrical member and said housing.

Another object of the present invention is to provide a fuel vapor vent device of the preceding objects further characterized by a pressure transducer mounted on said body and a vent passage formed in said body communicating said pressure transducer with said vapor outlet passage.

These and other objects, advantages and features of the present invention will become more apparent from the following description and accompanying drawings wherein:

DETAILED DESCRIPTION OF THE PREFERRED EMBODIMENT

Figure 1:
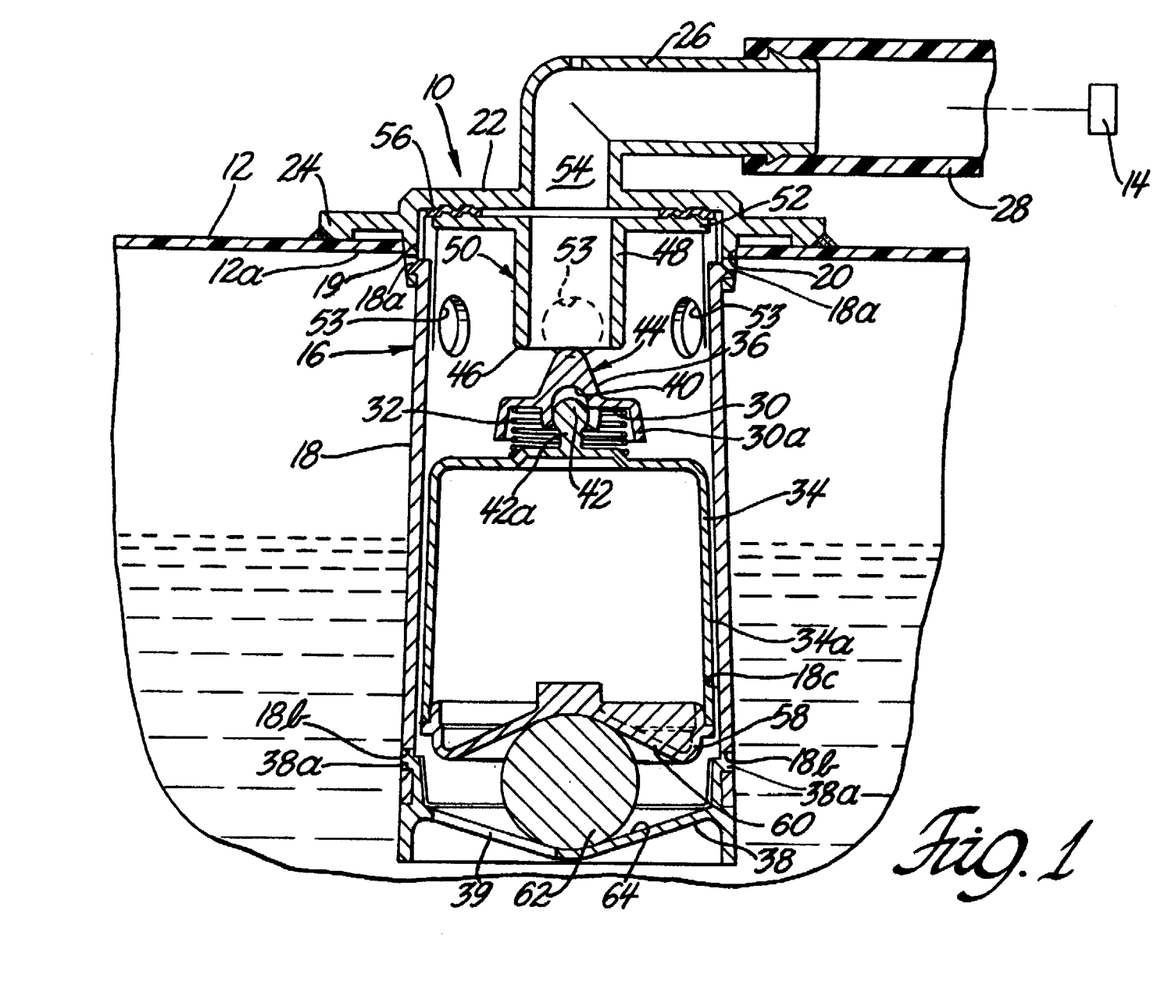
FIG. 1 is a sectional view of a motor vehicle fuel tank vapor vent valve assembly with a liquid fuel trap constructed in accordance with the present invention.

Referring to FIG. 1, there is illustrated a fuel vapor vent valve device 10 for venting a motor vehicle fuel tank 12 to a fuel vapor storage canister 14 containing a fuel absorber such as carbon. The fuel tank 12 is made of high density polyethylene (HDPE) as is the body 24 or 22 of the cover/top valve device, this material being selected for its ability to be welded to fuel tanks.

The valve device 10 comprises body 16 that includes a generally cylindrical valve containing section 18 with tabs 18a thereon snap fit to a cylindrical extension 19 received in an opening 20 in the top of the fuel tank 12. The valve device 10 further comprises a closed upper end cover or top 22 having a radially outwardly extending annular flange 24 that abuts with the tank about the opening 20. The top 22 is also made of a high density polyethylene (HDPE), this material being selected for its ability to weld to the fuel tank 12. Thus the flange 24 is welded about its perimeter to the tank to sealingly secure the fuel vapor vent valve device in place in a normal vertically oriented or upright position as shown. The valve body top 22 has an integrally formed hose fitting or outlet tube 26 by which the fuel vapor vent valve device is adapted to be connected by a hose 28 to the vapor storage canister 14. Mounted in the valve body are a spring seat 30, spring 32, float 34, valve 36 and a closure member 38 at the bottom of the valve containing section 18. A liquid inlet opening 39 is provided in the closure member 38 for communicating the interior of the valve body with the liquid fuel as the tank fills for purposes to be discussed.

The spring seat 30 has an annular skirt 30a and an elongated ball socket 40. A ball 42 is provided on the upper end of the float 34 for universally connecting the float 34 to the spring seat 30. The ball 42 is biased to the bottom of the elongated ball socket 40 by the spring 32 which allows the spring seat 30 to move relative to the float 34 in the vertical direction. The float 34 is located within the valve housing 18 and has a outer wall 34a centered in spaced relationship to the inner wall 18a of the valve housing 18. The spring seat 30 carries the valve element 36 as a central upstanding valve element with a tapered conical outer surface 44 aligned with a valve seat 46 on the end of an extension 48 of a vent tube or first tubular element 50 with an annular collar 52 located in sealing engagement with a vapor exit passage 54. In this embodiment of the invention the sealing engagement is provided in part by an annular seal member 56 interposed between the collar 52 and the underside of the cover or top 22. The vent tube 50 receives fuel vapors from the fuel tank from vapor exit ports 53 formed in the upper end of the valve housing 18 at a point located closely adjacent the upper wall or top 12a of the fuel tank and at a point that is high enough above the valve seat 46 to avoid fuel carry over into the vapor exit passage and hence into the fuel vapor canister 14.

The spring 32 rests on the seat 30 and is received at its lower end around the shank portion 42a of the ball 42 at a centrally located point on the upper end of the float 34.

In this embodiment, the float 34 includes a weighted closure disk 58 that will maintain the outer wall 34a of the float 34 in spaced relationship to the inner surface 18c of the valve housing 18.

The underside of the weighted closure disk 58 is configured to have a conical surface or ramp 60 that is supported on a ball 62 that is, in turn, supported by the conical inner surface or ramp 64 of the closure member 38. In the illustrated arrangement, the float and weighted closure disk 58 are heavy enough not to flow shut at low pressure buildups in the fuel tank 12, but are light enough to float in the fuel during a fuel filling operation in which the fuel level is raised in the fuel tank 12 toward the top 12a thereof. The weight in the weighted closure disk 58 is placed such that the float 34 always floats straight up within the valve housing 18 thereby to reduce frictional contact between the float 34 and the valve body 16. The angle of ramp of the conical surface 64 is configured such that it will allow the ball 62 to move and shut the float when the vehicle tilts greater than a predetermined amount, such as in a range of 30°. The ball 62 also has to be heavy enough to close the float shut when the vehicle rolls over.

In the embodiment of the invention shown in FIG. 1, the bottom closure member 38 includes tabs 38a thereon that are configured to fit into openings 18b on the bottom end of the valve housing 18. It includes a liquid inlet opening 39 therein to allow for a substantially unrestricted flow of fuel into the interior of the valve housing 18 for causing the float 34 to float in response to liquid fuel flow into the tank 12.

In accordance with certain principles of the present invention, the vapor exit passage 54 is configured to be large enough to vent vapors at the same rate as the rate of fuel flow into the fuel tank during a filling operation. The communication between the vapor exit ports 53 and the inlet end of the vapor tube 48 is selected so that there is no orifice-like restriction therebetween that can produce over pressurization of the tank during filling. The result is that there is substantially no pressure build up in the fuel tank during the refueling operation due to entrapment of vapor therein. The vapor exit ports 53 are configured and located so that vapor can vent from the tank and out the port or vapor exit passage 54 through a offset flow path defined by the fact that the vent exit ports 53 are located above and laterally of the entrance to the vent tube 50 at the valve seat 46 thereon. The vent exit ports 53 need to be large enough to cause vapors to flow without restriction during the refueling operation. Furthermore, they must be high enough in the tank so that the liquid droplets that might occur in the tank are not able to directly flow from the vapor exit ports 53 to the valve seat 46 during the refueling operation or during tilting or other jousting of the fuel tank 12 thereby to avoid any fuel carryover to the charcoal canister 14 that can affect its vapor absorbing capacity.

In the embodiment of FIG. 1, the conical configuration of the tapered outer surface 44 is selected to slowly restrict vapor flow during closure of the float valve that would otherwise build up pressure in the fuel tank as the fuel moves the float upwardly during a fuel filling operation. The conical shape is configured so that there is enough pressure build up in the tank to shut the fuel nozzle supplying the tank from the fuel filler pipe even though the float valve is not completely closed. This allows for some of the vapor to vent and drain the fuel in the filler pipe head as the tank reaches its fuel shut off level. Additionally, the conical part of the valve is spring loaded by the spring 32 to allow the valve element 36 to shift into a centered relationship with the valve seat center 46 for sealing thereacross when the roll-over valve is closed.

Additionally, the above-described arrangement avoids a sudden build up of pressure in the tank that might otherwise cause a fuel spit back effect at the fill head.

The location of the valve seat 46 is below the vapor exit ports 53 and is located at a height below the top of the fuel tank 12 to provide a desired fuel shut off height that will allow for an assured vapor dome space in the fuel tank that will enable vapor pressure buildup to occur after the float valve is closed.

Figure 2:
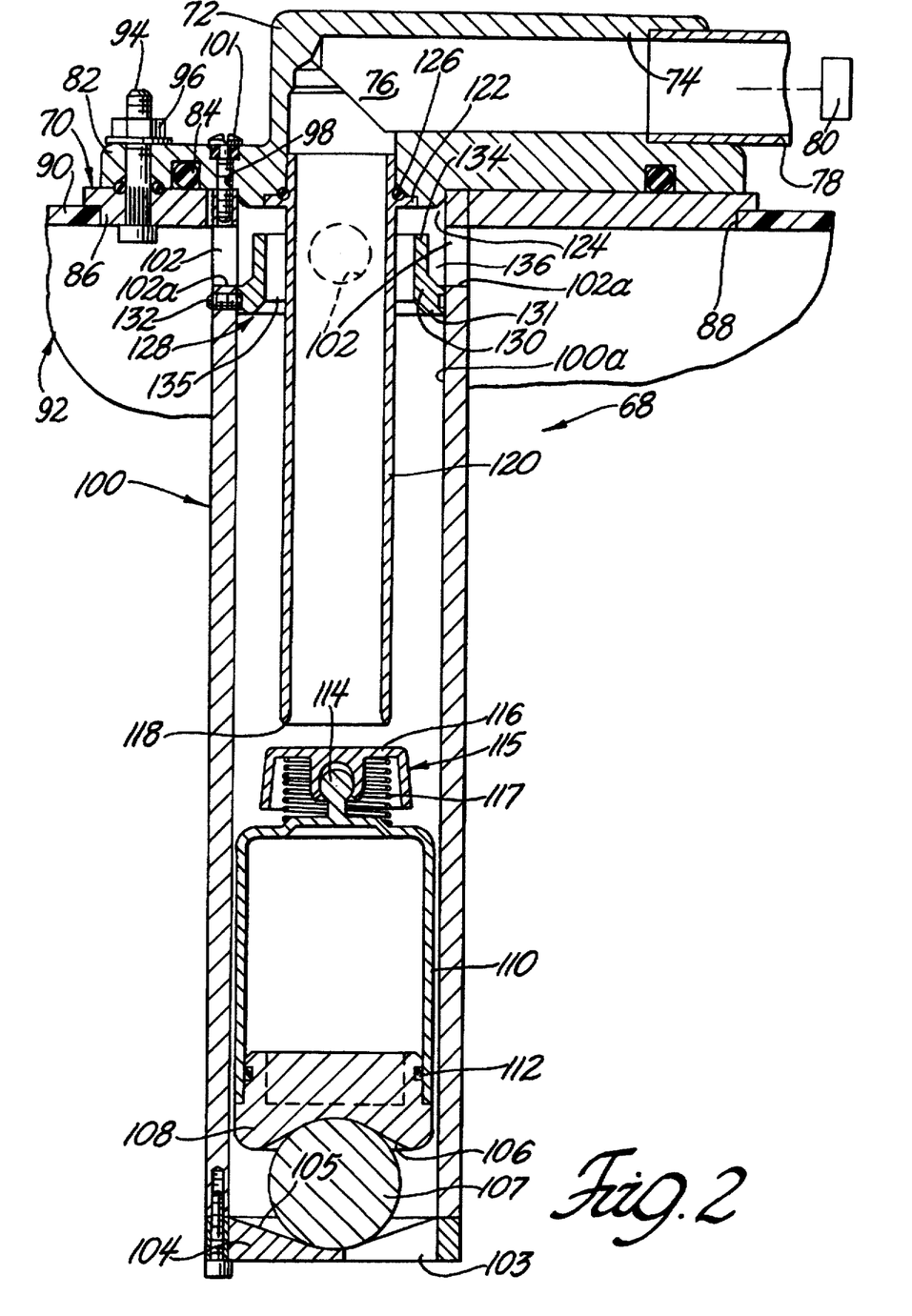
FIG. 2 is a sectional view of a vent valve assembly like that shown in FIG. 1 of another embodiment of the invention.

Another embodiment of the invention is illustrated in FIG. 2. In this embodiment, the fuel vapor vent valve device 68 includes a valve body 70 and a cover or top 72. The top 72 has an outlet tube 74 formed therein defining a vapor exit passage 76 that can be communicated by a flexible tube 78 to the inlet of a fuel vapor canister 80 shown diagrammatically in FIG. 2.

In this embodiment, the cover 72 includes a flange 82 that carries an annular seal 84 held in sealing engagement with a fitting 86 that is adapted to be seated in a tank opening 88 in the top 90 of a fuel tank 92 corresponding to the fuel tank 12 in the first embodiment. In this arrangement, the cover flange 82 is held on the fitting 86 by a plurality of fasteners shown as bolts and nuts 94, 96. A plurality of bores are provided through the cover flange 82 to communicate with aligned bores formed in the upper end of a valve housing 100 that is attached to the cover 72 by a threaded fastener 101 having a O-ring seal at the outer end thereof. In the embodiment of FIG. 2 the valve housing 100 includes a plurality of circumferentially spaced vapor exit ports 102 therein that are formed as a plurality of equal diameter openings at equal spaces around the circumference of the upper end of the valve housing 100. The lower end of the valve housing 100 is connected to a closure member 104 having a liquid inlet passage 103 formed therein. The closure member 104 corresponds to the closure member 38 in the first embodiment and includes a like conical surface 105 supporting a like ball 107 that engages a conical surface 106 on the bottom of a float weight 108 that is inserted in and sealed with respect to the open end of a hollow float member 110 corresponding generally to the float member 34 shown in the first embodiment. In this embodiment, an annular seal 112 is provided between the weight member 108 and the inner surface at the lower open end of the float 110 to seal therebetween. Alternatively the float weight 108 and the float member 110 could be ultrasonically welded together or blow molded as one piece to simplify manufacture.

The float 110 in this embodiment carries a universally adjustable ball socket connection 114 like that shown in the first embodiment. However, in this embodiment a spring seat 115 has a flat surfaced valving element 116. This element is supported by the ball socket connection 114 and a biasing spring 117 associated with the connection 114 in surrounding relationship therewith for sealing movement with respect to a valve seat 118 on the end of a first tubular member or vent tube 120 that is in communication with the vapor exit passage 76. In this embodiment, the vent tube has a flanged upper end 122 that extends through an opening 124 through the tank top fitting 86 and fits into the lower end of the vapor exit passage 76 where it is sealed with respect to the cover 72 by an annular O-ring seal 126. The length of the first tubular member 120 is greater than one half of the length of the valve housing 100 with a major portion of the length extending below the top or upper wall 90 of the fuel tank 92 as shown in FIG. 2, so as to provide a substantial vapor dome space within the tank 92 when the float valve is closed to serve the same purpose as the vapor dome space provided by the valve arrangement in the first embodiment. The first tubular member 120 can be replaced with tubular members of different lengths so that the valve device 68 can be used with different fuel tanks.

In accordance with other principles of the present invention, the valve seat 118 is located a substantial distance below the vapor exit ports 102 to prevent direct flow path for liquid droplet passage from the vapor exit ports 102 into the vent tube 120, but, additionally, a baffle assembly 128 is provided. Specifically, the baffle assembly includes a baffle ring 130 having an annular base 131 sealingly connected to the inner surface 100a of the valve housing 100 at the upper end thereof. A set screw 132 secures the annular base 131 to the valve housing 100. The baffle ring 130 further includes an upstanding flange 134 that has an inside diameter greater than the outside diameter of the vent tube 120. The upstanding flange 134 also has an outside diameter that is smaller than the inside diameter of the valve housing 100. Accordingly, the arrangement defines an annular vapor flow path 135 between the vent tube 120 and the baffle ring 128 and, additionally, provides an annular pocket 136 between the baffle ring 128 and the vapor exit ports 102. Each of the circumferentially spaced vapor exit ports 102 include a bottom edge 102a that is located at the bottom of the annular pocket 136. As a result, during a fuel filling operation or other operations of the fuel system that will cause liquid fuel droplets to pass through the vent ports 102, fuel droplets are first deflected from the entrance defined by the valve seat by the disposition of the vent tube 120 with respect thereto. Secondarily, any fuel droplets will be removed from the vapor stream by the baffle ring 128 and collected in the annular pocket 136, from hence they are free to flow across the lower edge 102a of each of the vapor exit ports 102 for flow back into the tank.

The baffle ring 128 may be molded or otherwise provided on an integral part of the valve housing 100.

Figure 3:
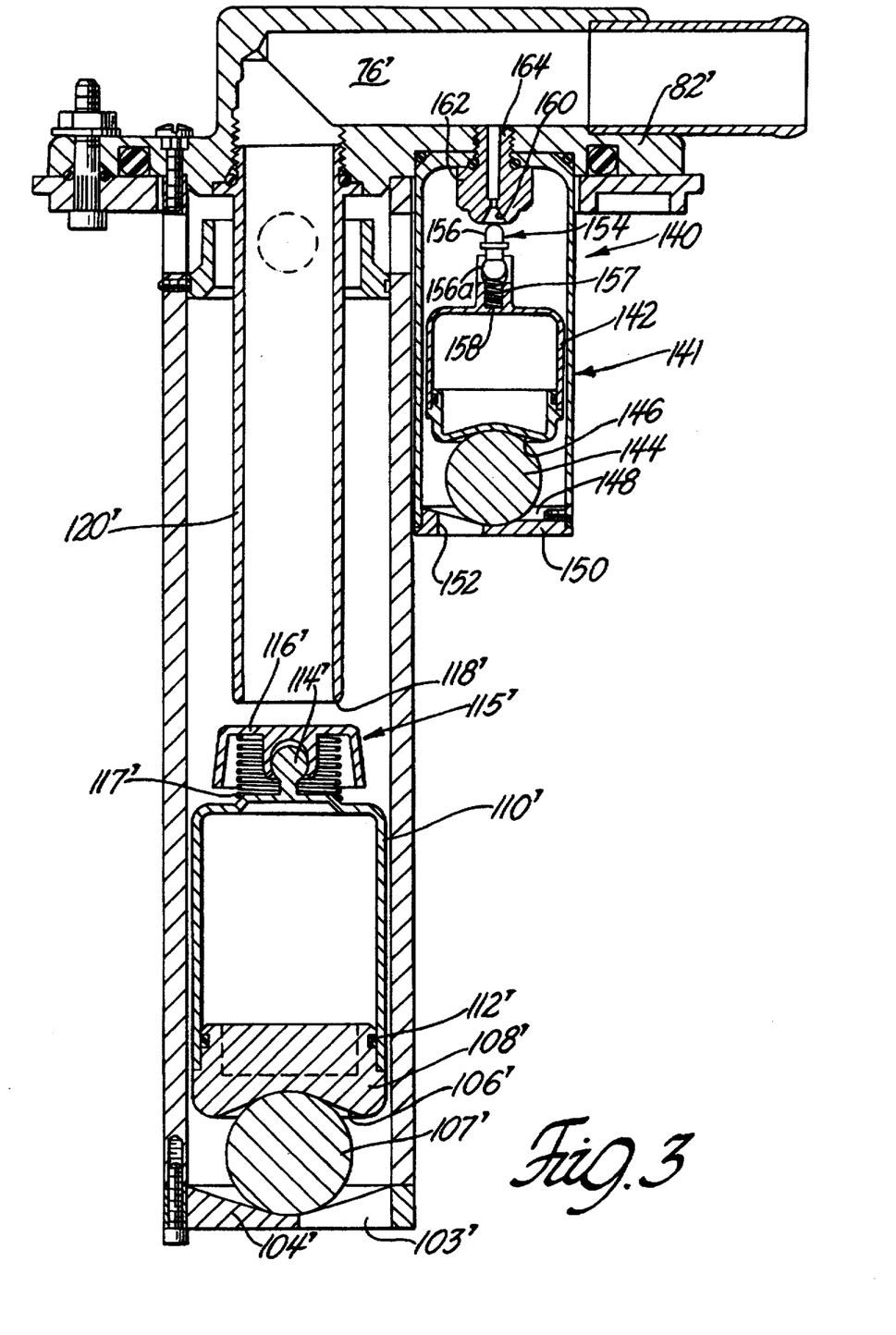
FIG. 3 is a sectional view of a vent valve assembly like that shown in FIGS. 1 and 2 of still another embodiment of the invention.

The embodiment of the invention shown in FIG. 3 corresponds to that shown in the embodiment of the invention shown in FIG. 2 and the operative components of the float valve and baffle assembly that are like those in the embodiment of FIG. 2 are marked with the same reference numerals primed. In this embodiment, in addition to the venting action provided to the vent tube 120', when the float valve is closed, a secondary vent system 140 is provided that includes a second tubular housing member 141 having the upper end thereof connected to the underside of the flange 82'. The housing supports a float 142 carried by a ball 144 for ramp movement with respect to a tapered surface 146 on the end of the float 142 and a tapered surface 148 on a closure member 150 that is fastened to the lower open end of the housing member 141. The closure member 150 has a liquid inlet opening 152 therein. The upper end of the float 142 carries a valve element 154 having a tapered conical upper surface 156. The valve element is secured by a ball joint connection 156a with respect to the upper end of the float 142 and is spring biased in its closed position by a spring 157 seated within a recess 158 formed in the upper wall of the float 142. The valving element 154 seats in a conical seat 160 formed in a hollow insert 162 with an extension 164 thereon that extends through the flange 82' to communicate with the vapor exit passage 76' such that the tank will continue to be vented even though the valve 116' is closed.

Figure 4:
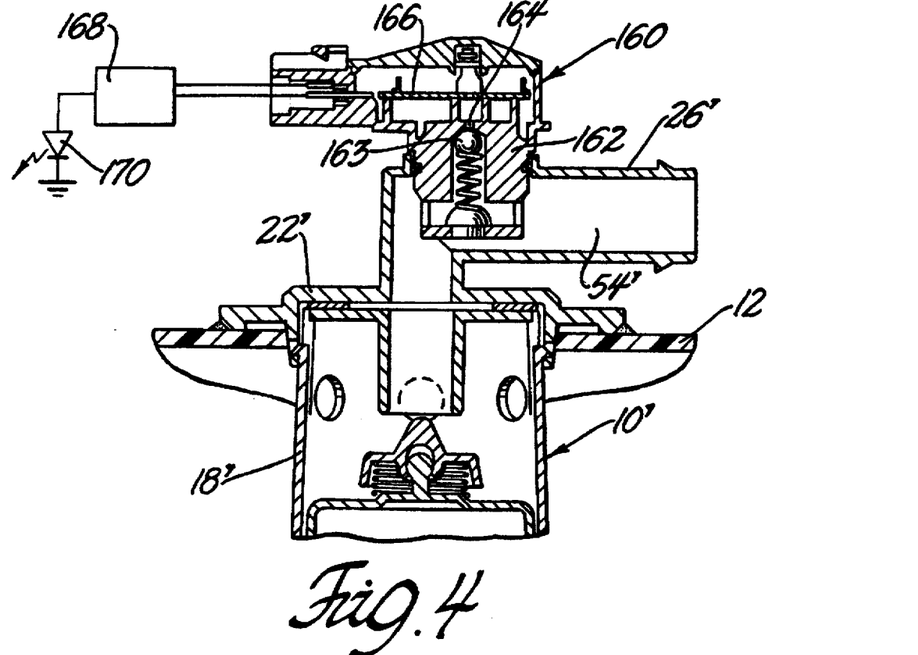
FIG. 4 is a sectional view of the embodiment of FIG. 1 including a pressure transducer connection therein.
Figure 5:
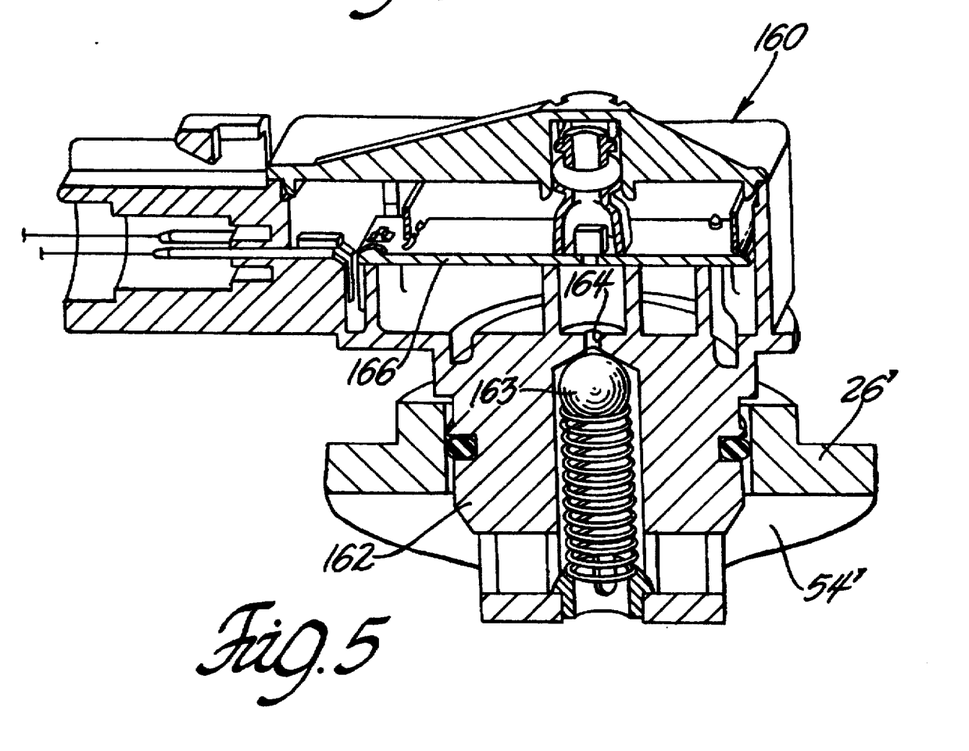
FIG. 5 is an enlargement of a portion of FIG. 4.

The embodiment of the invention shown in FIGS. 4 and 5 corresponds to that shown in FIG. 1 and like components therein are identified with like reference numerals primed. In this embodiment the fuel vapor vent assembly 10' includes like parts that function as set-forth in the description of the embodiment of FIG. 1. Additionally, the fuel vapor vent assembly 10' includes an on board pressure detector or transducer 160 that is connected by an inlet fitting 162 having a spring biased, normally closed check valve 163. The check valve 163 opens when the fuel tank is evacuated during a system integrity check that is instituted when the vehicle ignition is initially turned on to a "key-on" condition and at other selected times during vehicle operation. The transducer 160 includes a suitable pressure detector 166 such as a piezoresistive silicon die surface that is connected in a wheatstone bridge and associated with an amplifier circuit for producing a voltage output signal on detection of a tank vacuum decay condition. The pressure detector and associated circuits are of the type shown in copending U.S. patent application Ser. No. 08/204,116, filed Mar. 1, 1994; now U.S. Pat. No. 5,500,509 issued Mar. 19, 1996, client docket No. 93033. The control signal from the diagramatically illustrated control circuit 168 is operative to energize a suitable indicator such as a light emitting diode or filament type bulb 170 when the system integrity is acceptable. In the operation of the system integrity check the fuel tank 12 is evacuated. The check valve 163 is opened and the vacuum condition is imposed on the pressure detector 166. If the system is sealed, the test vacuum will not decay and the pressure detector 166 will remain in a desired resistance range. If the system is leaking, the test vacuum will decay and the resistance of the pressure detector 166 will vary to condition the associated circuit and indicator 170 to indicate the lack of system integrity. The advantage of the present invention is that the pressure transducer 160 is carried by the cover 20' and connected to the exit passage 54' of the fuel vapor vent assembly 10' for detecting the vacuum test condition in the fuel tank 12 during the test period without requiring that a separate connection into the wall of the fuel tank 12 that must be sealed in place on the tank. The arrangement thus eliminates parts and enables a single assembly to pretested for leakage prior to installation on a fuel tank while providing the ability to communicate running loss vapor flow or refueling vapor flow to the onboard charcoal canister in the vehicle while also providing a device integral with the fuel vapor vent assembly that will continuously check system integrity.

Figure 6:
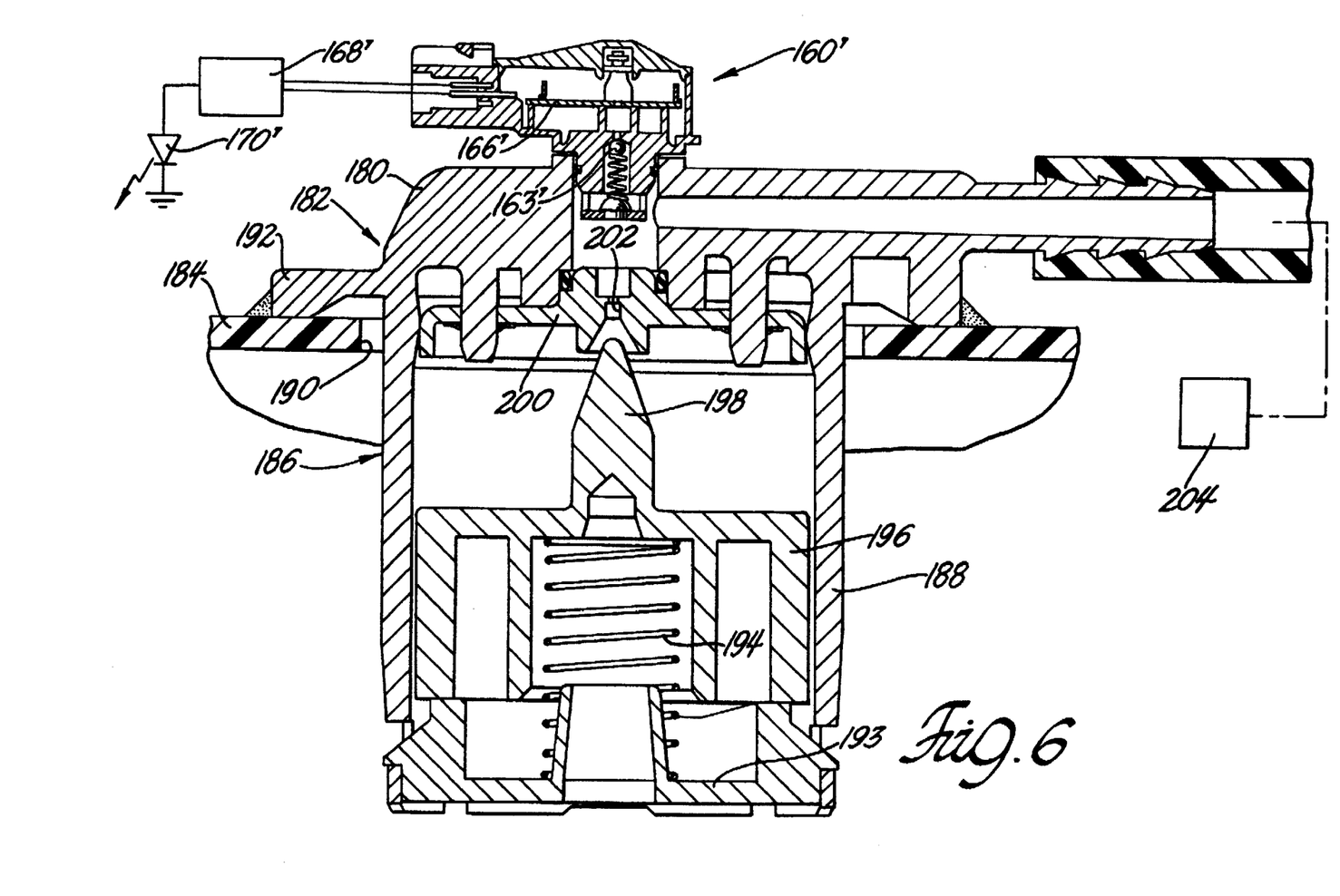
FIG. 6 is a sectional view of still another embodiment of the invention including a pressure transducer connection as shown in FIG. 4.

In the embodiment of FIG. 6 a like onboard pressure transducer is shown having the same parts and operation as in the embodiment of FIGS. 4 and 5 and in which case the like parts operating in the same way carry the same reference numerals primed. In this embodiment the pressure transducer 160' is carried on the cover 180 of a fuel vapor vent assembly 182 that is disposed vertically within a fuel tank 184. The fuel vapor vent assembly 182 includes a body 186 having a generally cylindrical valve containing section 188 received in an opening 190 in the fuel tank 184. The top or cover 180 includes a flange 192 that is sealed with respect to the tank 184 around the opening 190 therein. Mounted in the valve body are a spring seat 193, a spring 194, float 196 and valve 198 and an insert 200 with a central vent orifice 202 through which the fuel vapor is vented to a canister 204. This embodiment of the invention including the aforesaid components thereof find counterpart elements in U.S. Pat. No. 5,413,137 and the function of which is clearly described in the '137 patent which description is incorporated herein by reference.

The invention has been described in an illustrative manner with respect to one embodiment, and it is to be understood that the terminology that has been used is intended to be in the nature of words of description rather than of limitation. Obviously, many modifications and variations of the present invention in light of the above teachings may be made. For example, the invention has been illustrated as adapted to a vent valve assembly wherein the valve is operated with a float but the valve could also be operated with a gravity device that responds to tilting of the tank to close the orifice. Or the valve could be omitted altogether according to a particular motor vehicle fuel tank requirement. It is therefore to be understood that within the scope of the appended claims, the invention may be practiced otherwise than as specifically shown and described.

What is claimed is:

1. A fuel vapor assembly adapted to be mounted in the top of a motor vehicle fuel tank, said assembly comprising a body having an entry passage adapted to be open to liquid fuel and fuel vapor and a vapor exit passage adapted to be connected to a fuel vapor storage device and the body being connected to the top of a fuel tank in depending relationship therewith; a valve and said valve including a float and a valving element carried by the float and tiltable with respect to the float for compensating for tilt further characterized by:

said body further including a vapor inlet passage located above said entry passage;

a first tubular member supported within said body having one end sealingly connected to the vapor exit passage and having an opposite end defining a valve seat closable by the valving element and located below said vapor inlet passage for separating liquid fuel particles prior to entering said vapor exit passage; and a baffle ring connected to said body below said vapor inlet passage and spaced from said first tubular member for trapping liquid fuel particles at said vapor inlet passage for return to the fuel tank through the vapor inlet passage so as to prevent passage thereof through the first tubular member and out said vapor exit passage.

2. The fuel vapor vent assembly of claim 1 further characterized by said baffle ring having a lip sealingly connected to said body and including an upstanding flange with an I.D. greater than the O.D. of said first tubular member for defining an annular vapor flow path therebetween and said flange further including an O.D. less than the I.D. of said body for defining an annular pocket for trapping fluid; said vapor inlet passage being formed by a plurality of circumferentially spaced openings in said body; each of said openings having a lower edge portion located at or below said pocket for draining liquid fuel particles collected therein.

3. The fuel vapor vent assembly of claim 1 further characterized by said first tubular member having a length more than one half of that of said body for locating said valve seat at a distance from the upper wall of the fuel tank that will provide for a predetermined vapor dome space within said tank to accommodate vapor pressure increases when the valve seat is closed by the valving element.

4. A fuel vapor vent assembly adapted to be mounted in the top of a motor vehicle fuel tank, said assembly comprising a body having an entry passage adapted to be open to liquid fuel and fuel vapor and a vapor exit passage adapted to be connected to a fuel vapor storage device and the body being connected to the top of a fuel tank in depending relationship therewith; a valve and said valve including a float and a valving element carried by the float and tiltable with respect to the float for compensating for tilt further characterized by:

said body further including a vapor inlet passage located above said entry passage;

a first tubular member supported within said body having one end sealing connected to the vapor exit passage and having an opposite end defining a valve seat closable by the valving element and located below said vapor inlet passage for separating liquid fuel particles prior to entering said vapor exit passage;

a cover member connected to and outboard of the upper wall of the fuel tank; said cover member forming said vapor outlet passage and said body including a second elongated tubular member connected to said cover member inboard of said fuel tank and said vapor inlet passages being formed in said second elongated tubular member adjacent the upper wall of the fuel tank, and a baffle ring connected to said body below said vapor inlet passage and spaced from said first tubular member for trapping liquid fuel particles at said vapor inlet passage for return to the fuel tank through the vapor inlet passage so as to prevent the fuel tank through the vapor inlet passage so as to prevent passage thereof through the first tubular member and out said vapor exit passage.

5. The fuel vapor vent assembly of claim 4 further characterized by said baffle ring having a lip sealingly connected to said second tubular member and including an upstanding flange with an I.D. greater than the O.D. of said first tubular member for defining an annular vapor flow path therebetween and said flange further including an O.D. less than the I.D. of said body for defining an annular pocket for trapping fluid; said vapor inlet passage being formed by a plurality of circumferentially spaced openings in said second tubular member; each of said openings having a lower edge portion located at or below said pocket for draining liquid fuel particles collected therein.

6. The fuel vapor vent assembly of claim 4 further characterized by said first tubular member having a length more than one half of that of said body for locating said valve seat at a distance from the upper wall of the fuel tank that will provide for a predetermined vapor dome space within said tank to accommodate vapor pressure increases when the valve seat is closed by the valving element.

7. A fuel vapor vent assembly adapted to be mounted in the top of a motor vehicle fuel tank, said assembly comprising a body having an entry passage adapted to be open to liquid fuel and fuel vapor and a vapor exit passage adapted to be connected to a fuel vapor storage device and the body being connected to the top of a fuel tank in depending relationship therewith; a valve and said valve including a float and a valving element carried by the float and tiltable with respect to the float for compensating for tilt further characterized by:

said body further including a vapor inlet passage located above said entry passage;

a first tubular member supported within said body having one end sealingly connected to the vapor exit passage and having an opposite end defining a valve seat closable by the valving element and located below said vapor inlet passage for separating liquid fuel particles prior to entering said vapor exit passage;

a cover member connected to and outboard of the upper wall of the fuel tank; said cover member forming said vapor outlet passage and said body including a second elongated tubular member connected to said cover member inboard of said fuel tank and said vapor inlet passages being formed in said second elongated tubular member adjacent the upper wall of the fuel tank, and a third tubular member having a height less than that of said first tubular member and located laterally thereof and including a vent therein in communication with said vapor outlet passage and a float within said third tubular member for closing said vent in response to tilt to prevent escape of liquid fuel from the fuel tank through said vent.

8. A fuel vapor vent assembly adapted to be mounted in the top of a motor vehicle fuel tank, said assembly comprising a body having an entry passage adapted to be open to liquid fuel and fuel vapor and a vapor exit passage adapted to be connected to a fuel vapor storage device and the body being connected to the top of a fuel tank in depending relationship therewith; a valve and said valve including a float and a valving element carried by the float and tiltable with respect to the float for compensating for tilt further characterized by:

said body further including a vapor inlet passage located above said entry passage;

a first tubular member supported within said body having one end sealingly connected to the vapor exit passage and having an opposite end defining an annular valve seat closable by the valving element and located below said vapor inlet passage for separating liquid fuel particles prior to entering said vapor exit passage; and said valving element having an annular skirt and a ball joint thereon located concentrically of said annular skirt; said float having a ball connected on one end thereof for adjusting the position of said valving element with respect to said annular valve seat to compensate for tilt.

9. The fuel vapor vent assembly of claim 8 further characterized by said float comprising a hollow cylindrical member with a closed end and an open end and a weighted closure disc on said open end for sealing the float; said weighted closure disc having a weight selected with respect to the displacement of said hollow cylindrical member for aligning said float vertically within said body for reducing friction between the hollow cylindrical member and said body.

10. A fuel vapor vent assembly adapted to be mounted in the top of a motor vehicle fuel tank, said assembly comprising a body having an entry passage adapted to be open to liquid fuel and fuel vapor and a vapor exit passage adapted to be connected to a fuel vapor storage device and the body being connected to the top of a fuel tank in depending relationship therewith; a valve and said valve including a float and a valving element carried by the float and tiltable with respect to the float for compensating for tilt further characterized by:

said body further including a vapor inlet passage located above said entry passage;

a first tubular member supported within said body having one end sealingly connected to the vapor exit passage and having an opposite end defining a valve seat closable by the valving element and located below said vapor inlet passage for separating liquid fuel particles prior to entering said vapor exit passage; and a pressure transducer mounted on said body and a vent passage formed in said body communicating said pressure transducer with said vapor outlet passage.

* * * * *